May 6, 1930.　　　　　C. L. HAWES　　　　　1,757,567
AUTOMOBILE RADIATOR ORNAMENT
Filed June 24, 1929　　　　2 Sheets-Sheet 1
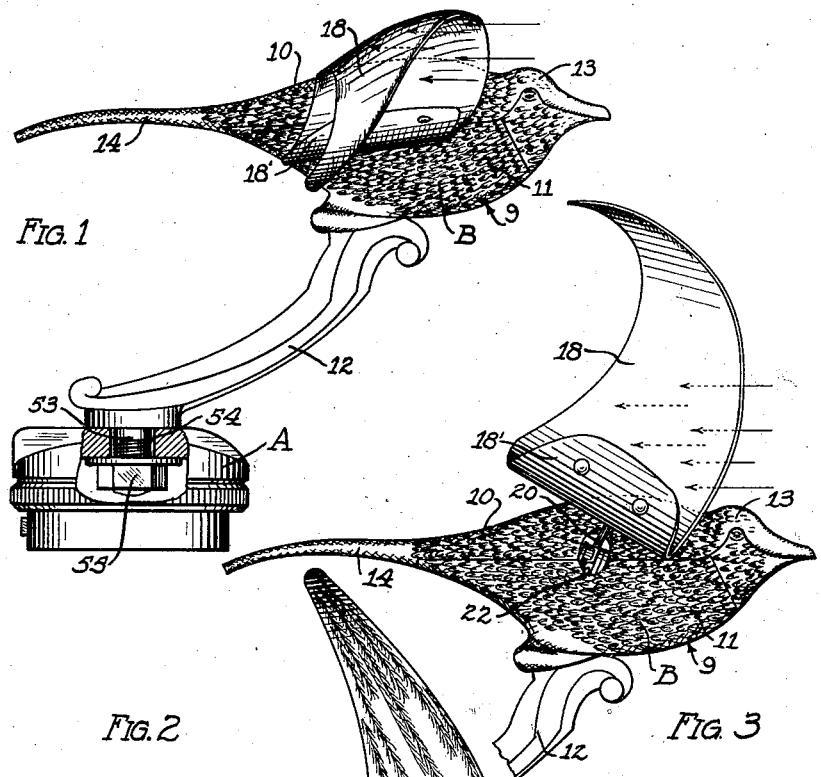
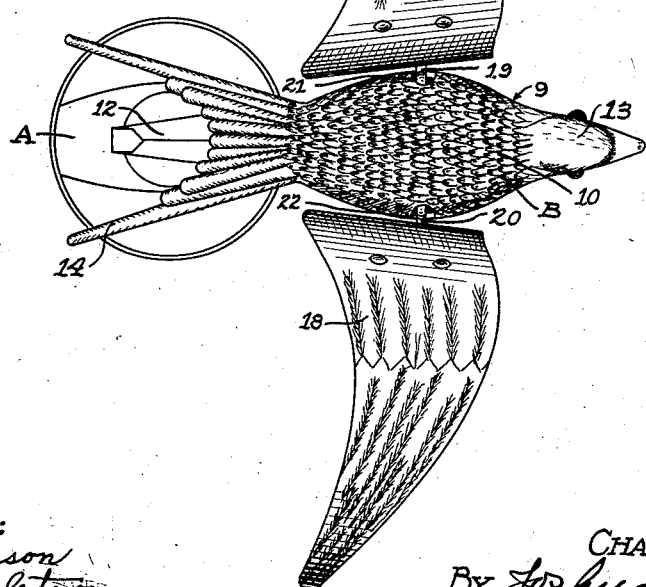
WITNESSES:
R. A. Larsson
F. C. Appleton
INVENTOR:
CHARLES L. HAWES,
By Joshua R. H. Potk
HIS ATTORNEY.

May 6, 1930.   C. L. HAWES   1,757,567
AUTOMOBILE RADIATOR ORNAMENT
Filed June 24, 1929   2 Sheets-Sheet 2

WITNESSES:
R. A. Larsson
F. C. Appleton

INVENTOR:
CHARLES L. HAWES,
By Joshua R. H. Potts
HIS ATTORNEY.

Patented May 6, 1930

1,757,567

UNITED STATES PATENT OFFICE

CHARLES L. HAWES, OF CHICAGO, ILLINOIS, ASSIGNOR TO CHRISTOPHER STRASSHEIM, OF CHICAGO, ILLINOIS

AUTOMOBILE RADIATOR ORNAMENT

Application filed June 24, 1929. Serial No. 373,163.

My present invention relates to automobile ornaments, being an improvement over the device described and illustrated in my copending application, Serial No. 305,907, filed September 14, 1928, for automobile radiator ornaments.

The object of this invention is to provide a device of the kind indicated, with certain desired improvements in the way of affording a more efficient and smoother operating mechanism.

Additional objects and advantages of the construction now employed will appear more fully in the details of construction hereinafter set forth, when taken in connection with the accompanying drawings in which:

Fig. 1 is a side elevational view of the invention as applied to the radiator cap of an automobile, the wings of the bird being shown in normal lowered position;

Fig. 2 is a plan view of the device;

Fig. 3 is a view similar to Fig. 1, with parts broken away, showing the wings of the bird in raised position when acted on by a blast of air;

Figure 4:
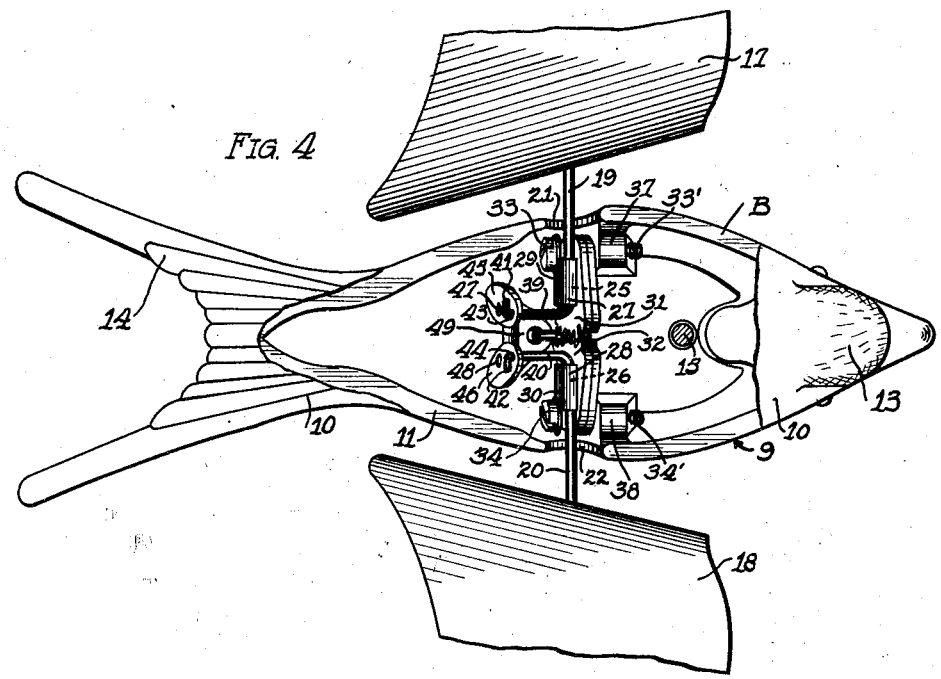
Fig. 4 is a plan view of the invention, with parts of the upper body casing removed.

In the drawings, A designates the radiator cap of an automobile to which the ornamental bird B embodying my invention and hereinafter to be described, is secured.

Figure 5:
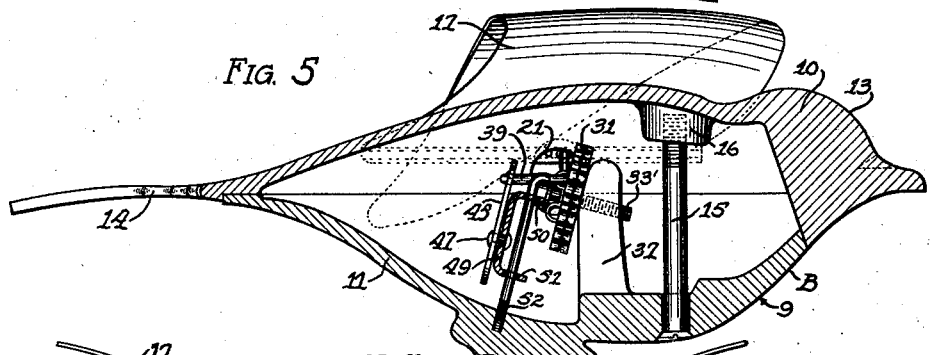
Fig. 5 is a vertical longitudinal sectional view taken substantially centrally of the device.
Figure 6:
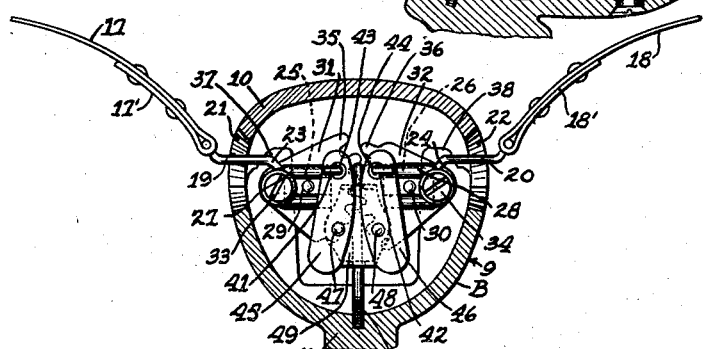
Fig. 6 is a transverse sectional view taken to the rear of the operating mechanism.

As exteriorly viewed, the bird B comprises a casing 9 having an upper or lid section 10 and a registering or lower body section 11 to which latter is integrally secured the branch or arm 12 on which the body section 11 is securely fastened. As best shown in Figs. 4, 5 and 6, the casing 9 serves to enclose an operating mechanism hereinafter to be described, the upper section 10 of this casing being configured to provide an integral head 13 and a bifurcated tail 14. The upper section 10 is secured to the lower body section 11 by a bolt 15 which may be of the machine screw type, and which is threadedly secured in a downwardly projecting socket lug 16 formed integral with the upper section 10.

Projecting from either side of the bird is a pair of wings 17, 18 having folded over and riveted portions 17', 18' which latter serve as means to fasten the inserted ends of links 19, 20, it being observed that these latter pass through apertures 21, 22 formed between the registering top and bottom sections 10 and 11, respectively. It will also be observed that links 19, 20 after immediately passing into the interior of the body of the bird have downwardly projecting portions 23, 24 joined to straight portions 25, 26, which latter pass through and turn in sockets 27, 28 provided in a pair of members 29, 30, which are riveted or otherwise suitably secured to rockingly mounted plates 31, 32 hereinafter to be described. As best shown in Figs. 4 and 6, the plates 31, 32 which are swingingly mounted on journal screws 33, 34, are provided with segmental coacting racks 35, 36. The journal screws 33, 34, have threaded ends 33', 34', which are threadedly received in bearing lugs 37, 38, which are preferably formed integral with the body section 11. As best shown in Fig. 4, the links 19, 20 after passing through the sockets 27, 28, have bent portions 39, 40, at right angles to the straight portions 25, 26, the bent portions 39, 40, terminating in hooks 41, 42, which are clenched after passing through holes 43, 44 in two vertically positioned plates 45, 46 which are swingingly mounted on pins 47, 48 riveted or otherwise suitably secured to a U-shaped member or yoke 49, having ears 50, 51, which are perforated to receive a link or stem 52 threadedly secured in the post of the body section 11. As best shown in Fig. 4, it will be seen that the plates 31, 32 are arranged in pairs, one pair to each of the journal screws 33, 34. I have found the provision of a pair of plates to each journal screw, to afford a somewhat smoother action which is highly desirable in permitting the greatest possible freedom to the wings 17 and 18 of the bird when the ornament is in operation.

From the foregoing description, the operation of my device has been in large indicated but will become more fully apparent in the following brief explanation. Assuming the bird to be mounted on the arm 12 which latter may be secured to the automobile cap A by a downwardly projected bolt 53, passed through a hole 54 in the cap A and secured to the top thereof by nut 55,—and the vehicle to be in motion, a current of air will strike against the wings 17 and 18, as best shown in Fig. 1, where the arrows denote the direction of movement of air relatively to the moving vehicle. The wings 17 and 18 which are in oblique position as shown in Fig. 1, and which act as levers of the inclined plane order, will now rise and angle into the position shown in Fig. 3, this motion of the wings causing the links 19, 20 to rock the plates 31, 32 downwardly, while at the same time the portions 39, 40 of these links will be convergingly brought together, as best shown in Fig. 6. This action of the links 19, 20 in the meantime causes the straight portions 39 and 40 to partly turn as viewed in the several figures, this causing the wings 17 and 18 to assume the position shown in Figs. 3 and 6. It will be observed that during the progressive action of the wings indicated, the plates 45, 46 which are swingingly mounted on the U-shaped member 49 will slide the latter downwardly on the stem 52 during the first part of the upward movement of the wings and the consequent downward movement of the portions 39, 40. By reason of the plates 45, 46 abutting against the floor of the body section 11, and consequently arresting downward movement of the hooks 41, 42 thereby, the other ends of the portions 39, 40 will swing downwardly when the wings 17, 18 approach the top of their upward movement. It will be noted that the momentum of the wings acquired through the impulse conveyed by a blast of air striking the lower inclined portion of the underneath surface of the wings, will now carry them to the position shown in Fig. 3, where the blast of air will thrust or strike against the backs of the wings, thus impelling them downwardly to a point where the momentum of the last impulse given to the wings will be neutralized by the blast of air again striking them from the underneath side, as shown in Fig. 1,—this completes one cycle. These cycles which occur very quickly when the vehicle to which the ornament is attached is in rapid motion, will cause the wings to perform a flapping motion which simulates the flight of a bird in a realistic manner. Since in actual practice this device is subjected to rather severe usage by reason of the many hours of daily operation, the average automobile is put to, the mechanism employed is of a design and ruggedness particularly adapted to enable the ornament to perform its functions over a long period of time. I have also provided, as best shown in Fig. 6, an additional socket on each of the members 29, 30, which may be used should the pair of sockets in which the links 19, 20 are mounted, become inefficient after long continued use.

While I have herein described and illustrated a preferred design and construction, it will be apparent that the invention is capable of considerable modification and variation without departing from the spirit or sacrificing any of the advantages of the details as set forth; hence it is to be understood the embodiment set forth is to be confined to the precise details only to the extent these are circumscribed within the scope of the appended claims.

Having described my invention, what I claim as new and desire to secure by Letters Patent is:

1. A device of the kind described comprising a casing, a pair of wings fastened to a pair of links, a pair of coacting racks pivotally mounted within said casing, and operatively connected to said respective links, a pair of plates within said casing, said plates having a pivotal connection with said respective links, and a slidable element within said casing pivotally connected to said plates.

2. A device of the kind described comprising a casing, a pair of bearing lugs in said casing, a pair of coacting racks rockingly connected to said bearing lugs, a pair of links pivotally connected to said racks, bent portions on said respective links, a pair of plates secured to said bent portions on said links and having a connection to an element slidably mounted on a member secured in the housing, and a pair of wings secured to said links.

3. A device of the kind described comprising a two part casing, the upper part of said casing having the configuration of the head, back and tail portions of a bird, the other section forming the lower body portion thereof and coacting with the upper section to provide a housing for mechanism, said mechanism including means for rockingly supporting a pair of coacting gear elements, a pair of links rockingly mounted on said gear elements, said links having bent portions connected to a pair of plates swingingly mounted on an element slidable on a member secured in the lower body portion of the casing, and a pair of wings secured to the other end of said links at a point exterior of the upper and lower sections whereby when said wings are acted on by a blast of air, the wings will anglingly rise and fall.

4. A device of the kind described comprising a pair of wings fastened to a pair of links, said links having crank portions movably connected to coacting plates rockably mounted on an element slidably connected to a fixed element, said links having a connection to a pair of coacting gear elements swingably mounted on a pair of elements serving as pivots, whereby when the wings are raised by a current of air, the links will rockingly move the said plates and said gear elements which coact to turn and rock the links and consequently the wings affixed thereto.

5. A device of the kind described comprising a two-part casing having the configuration of a bird, a pair of links rockingly mounted on a pair of gear elements swingably secured in a chamber formed by said two-part casing, said links having a connection to a pair of plates rockingly mounted on an element slidably secured in the said chamber, a pair of wings secured to the exterior ends of said links, the lower end of said plates abutting, when said wings and consequently said links are actuated by a blast of air, the lower part of said two-part casing.

6. An automobile radiator ornament comprising an upper section detachably secured to a lower section and providing in combination therewith a chamber for housing mechanism, said mechanism including a plurality of pairs of gear elements, each of said plurality of pairs of gear elements being swingably mounted and supported on one of a pair of journal members detachably secured in said lower section, a pair of links rockingly mounted relatively to said pair of journal members and having a pivotal connection to a pair of elements rockingly secured to a yoke slidably secured in said lower section, and a pair of wings secured to exterior ends of said links whereby said mechanism will provide a co-ordinated mechanical movement for simultaneously raising and angling said wings in a flapping manner when acted on by a blast of air.

In testimony whereof I have signed my name to this specification.

CHARLES L. HAWES.

CERTIFICATE OF CORRECTION.

Patent No. 1,757,567.     Granted May 6, 1930, to

CHARLES L. HAWES.

It is hereby certified that the above numbered patent was erroneously issued to "Christopher Strassheim, of Chicago, Illinois", as assignee of the entire interest in said invention, whereas said patent should have been issued to the inventor, said "Hawes, and Christopher Strassheim", said Strassheim being assignee of one-half interest only in said invention, as shown by the records of assignments in this office; and that the said Letters Patent should be read with this correction therein that the same may conform to the record of the case in the Patent Office.

Signed and sealed this 24th day of June, A. D. 1930.

M. J. Moore,
Acting Commissioner of Patents.

(Seal)